(12) United States Patent
Kottmyer

(10) Patent No.: US 6,360,540 B1
(45) Date of Patent: Mar. 26, 2002

(54) LOW VENT PRESSURE MASTER CYLINDER RESERVOIR CAP DIAPHRAGM

(75) Inventor: Daniel Lee Kottmyer, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/484,163

(22) Filed: Jan. 18, 2000

(51) Int. Cl.$^7$ ................................................. B60T 11/20
(52) U.S. Cl. .......................................... 60/585; 215/261
(58) Field of Search ........................... 60/585, 592, 584; 215/261; 220/361, 368

(56) References Cited

U.S. PATENT DOCUMENTS

| | | |
|---|---|---|
| 3,696,958 A | * 10/1972 | Lee .............................. 215/261 |
| 3,744,513 A | 7/1973 | Leitenberger |
| 4,630,443 A | 12/1986 | Steer |
| 4,805,668 A | 2/1989 | Genter et al. |
| 5,342,434 A | 8/1994 | Wu |
| 5,462,586 A | * 10/1995 | Sugiyama et al. ............. 96/13 |
| 6,178,747 B1 | * 1/2001 | Tang ............................ 60/585 |

* cited by examiner

Primary Examiner—Edward K. Look
Assistant Examiner—Thomas E. Lazo
(74) Attorney, Agent, or Firm—Robert M. Sigler

(57) ABSTRACT

A low vent pressure master cylinder reservoir cap diaphragm assembly is used to keep brake fluid in the reservoir but allow air to freely pass to and from atmosphere. The diaphragm assembly includes a flexible sealing component having an aperture and a fluid flow restrictive material bonded to the flexible sealing component covering the aperture. The fluid flow restrictive material allows a limited amount of brake fluid to pass through but allows air to freely pass through. The flexible sealing component is preferably made from a rubber material. The fluid flow restrictive material is preferably made from a material such as nylon that is either mesh or has small pores.

16 Claims, 2 Drawing Sheets

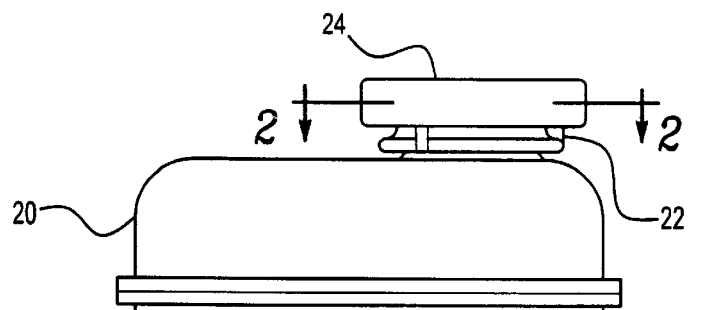
*Fig-1*
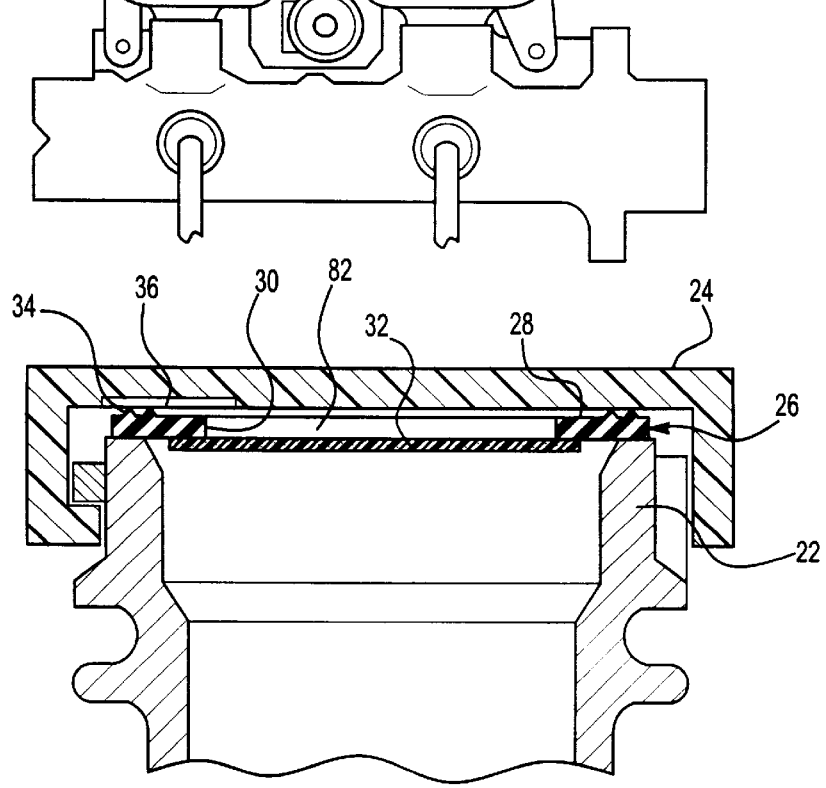
*Fig-2*
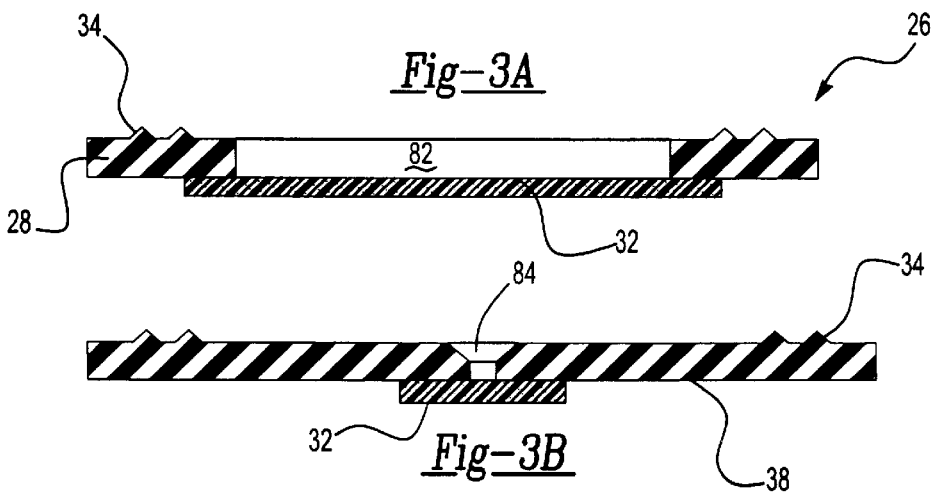
*Fig-3A*
*Fig-3B*

LOW VENT PRESSURE MASTER CYLINDER RESERVOIR CAP DIAPHRAGM

TECHNICAL FIELD

This invention relates to a master brake cylinder reservoir cap diaphragm assembly that prevents brake fluid from passing through but allows air to freely pass through.

BACKGROUND OF THE INVENTION

Brake master cylinder reservoirs require a method of venting to atmosphere to prevent a build-up of pressure or a vacuum in the reservoir. This demand is becoming more challenging due to evolving technology. For instance, vehicles equipped with traction control systems need to draw fluid from the master cylinder reservoir quickly.

It is well known to use a diaphragm in connection with the cap used to close the brake master cylinder reservoir. Typically, the diaphragm is rubber and has a vent slit through which air can pass.

There are several disadvantages of this design. The vent geometry does not freely allow air to flow through and thus restricts the amount of brake fluid that can be pulled from the master cylinder reservoir. Further, energy is required to open the vent, which results in brake fluid movement delay. Also, brake fluid can leak out through the vent slit.

SUMMARY OF THE INVENTION

The present invention provides alternatives and advantages over the prior art by providing a master brake cylinder reservoir cap diaphragm assembly that allows air to freely pass through but limits brake fluid from passing through. Master cylinder reservoirs require a method of venting to atmosphere to prevent a build-up of pressure or a vacuum in the reservoir.

Preferably, the diaphragm assembly includes a flexible sealing component having an aperture and a fluid flow restrictive material that is bonded to the flexible sealing component covering the aperture. The flexible sealing component is preferably ring-shaped and flat. Further, the flexible sealing component preferably has a raised section for providing a seal.

The diaphragm assembly is positioned between the fill neck of the master brake cylinder reservoir and the cap that connects to the fill neck. The raised section on the flexible sealing component creates a seal between the diaphragm assembly and the cap. However, a small channel is preferably formed in the cap for the passage of air to and from atmosphere.

BRIEF DESCRIPTION OF THE DRAWINGS

The invention will now be described, by way of example, with reference to the accompanying drawings in which:

FIG. 1 is an elevational view showing the exterior of a master brake cylinder reservoir with a cap attached to the fill neck.

FIG. 2 is a sectional view taken along line 2—2 of FIG. 1.

FIG. 3A is a cross sectional view of the preferred embodiment of the low vent pressure master brake cylinder reservoir cap diaphragm assembly.

FIG. 3B is a cross sectional view of an alternative embodiment of the low vent pressure master brake cylinder reservoir cap diaphragm assembly.

DESCRIPTION OF THE PREFERRED EMBODIMENT

Figure 4A:
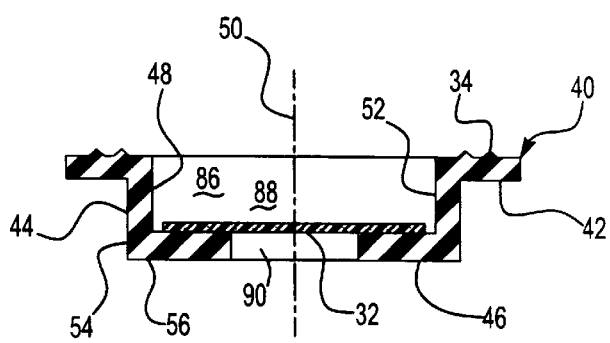
FIG. 4A is a cross sectional view of an alternative embodiment of the low vent pressure master brake cylinder reservoir cap diaphragm assembly.

Referring to FIG. 1, a master brake cylinder reservoir 20 is mounted in a vehicle (not shown) for storing brake fluid. A fill neck 22 is preferably connected to the master cylinder reservoir 20 and provides a passage for the brake fluid into the master cylinder reservoir 20. A cap 24 connects to the fill neck 22 to prevent the brake fluid from leaking out of the master cylinder reservoir 20.

As shown in FIG. 2, a low vent pressure master brake cylinder reservoir cap diaphragm assembly, shown generally at 26, is positioned between the fill neck 22 and the cap 24. The diaphragm assembly 26 includes a flexible sealing component 28 having an aperture 82 and a fluid flow restrictive material 32 that is bonded to the flexible sealing component 28 covering the aperture 82. The fluid flow restrictive material 32 allows a limited amount of brake fluid to pass through and allows air to freely pass through. Any type of material that limits the amount of fluid that can pass through but allows air to freely pass through in either direction can be used, including, but not limited to, nylon. Further, the material can be either a mesh or contain small pores. The flexible sealing component 28 is preferably made from a rubber material.

The cap 24 and the diaphragm assembly 26 are removed from the fill neck 22 when brake fluid is being added to the master brake cylinder reservoir 20. The flexible sealing component 28 includes a raised section 34 for providing a seal when the cap 24 is attached to the fill neck 22 and the diaphragm assembly 26 is positioned between the cap 24 and the fill neck 22. An airtight seal is not formed when the cap 24 is connected to the fill neck 22. Preferably, the cap 24 includes a channel 36 for the passage of air to and from atmosphere.

In the preferred embodiment, shown in FIG. 3A, the flexible sealing component 28 is generally ring shaped, flat, and has a larger aperture 82. The larger aperture 82 is preferably approximately 0.75 inches (19 mm) in diameter. In an alternative embodiment, shown in FIG. 3B, the flexible sealing component 38 has a smaller aperture 84. The smaller aperture 84 is preferably approximately 0.04 inches (1 mm) in diameter.

An alternative embodiment of the diaphragm assembly is shown in FIG. 4A. The flexible sealing component 40 includes a first section 42, a second section 44 and a third section 46 wherein the three sections are contiguous. The first section 42 is generally ring shaped having an aperture 86 that defines an inner circumferential surface 48 and a longitudinal axis 50. The second section 44 is generally cylindrically shaped with an internal bore 88 having a first end 52 and a second end 54. The third section 46 is generally ring shaped and has an aperture 90 and an outer circumferential surface 56.

The second section first end 52 is connected to the first section 42 adjacent the inner circumferential surface 48 and extends along the longitudinal axis 50. The second end 54 of the second section 44 is connected to the outer circumferential surface 56 of the third section 46. Therefore, the second section 44 internal bore 88 is aligned with the first section 42 aperture 86 and the third section 46 aperture 90. The fluid flow restrictive material 32 is bonded to the third section 46 and covers the third section aperture 90. The aperture 90 in the third section 46 can be either larger (see FIG. 4A) or smaller (not shown).

Figure 4B:
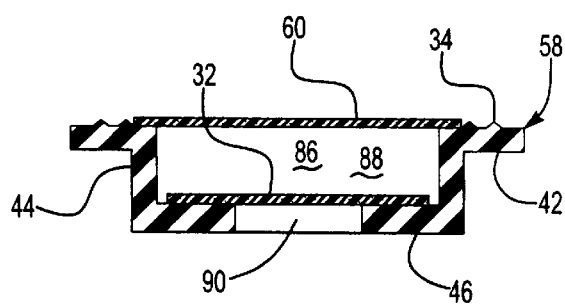
FIG. 4B is a cross sectional view of an alternative embodiment of the low vent pressure master brake cylinder reservoir cap diaphragm assembly.
Figure 4C:
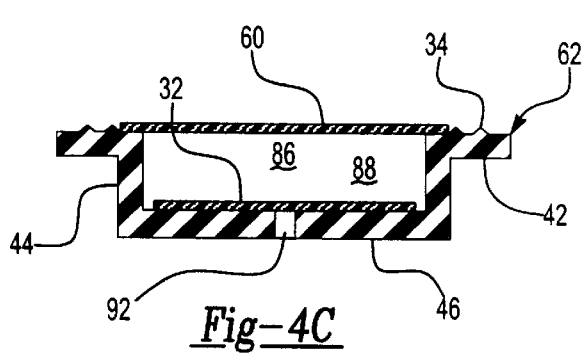
FIG. 4C is a cross sectional view of an alternative embodiment of the low vent pressure master brake cylinder reservoir cap diaphragm assembly.

In an alternative embodiment 58, as shown in FIG. 4B, a second piece of fluid flow restrictive material 60 is bonded to the first section 42 and covers the first section aperture 86. Another variation of the diaphragm assembly 62 is shown in FIG. 4C. The versions shown in FIGS. 4B and 4C differ only in the size of the third section aperture. FIG. 4B shows a larger third section aperture 90 and FIG. 4C shows a smaller third section aperture 92.

Figure 5A:
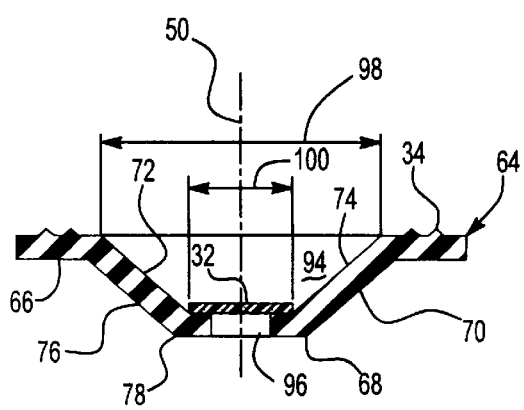
FIG. 5A is a cross sectional view of an alternative embodiment of the low vent pressure master brake cylinder reservoir cap diaphragm assembly.

An alternative embodiment 64 is shown in FIG. 5A. Similar to the embodiments shown in FIGS. 4A, 4B and 4C, the embodiment shown in FIG. 5A includes three contiguous sections. The first 66 and third 68 sections are generally ring shaped and each has an aperture 94, 96. The second section 70, on the other hand, is generally conically shaped and hollow.

The first section aperture 94 defines an inner circumferential surface 72 and a longitudinal axis 50. The second section 70 has a first end 74 having a first inner diameter 98 and a second end 76 having a second inner diameter 100. The first inner diameter 98 is larger than the second inner diameter 100. The third section 68 has an outer circumferential surface 78.

The second section first end 74 is connected to the first section 66 adjacent the inner circumferential surface 72 and the second section second end 76 is connected to the third section outer circumferential surface 78. The fluid flow restrictive material 32 is bonded to the third section 68 covering the third section aperture 96.

Figure 5B:
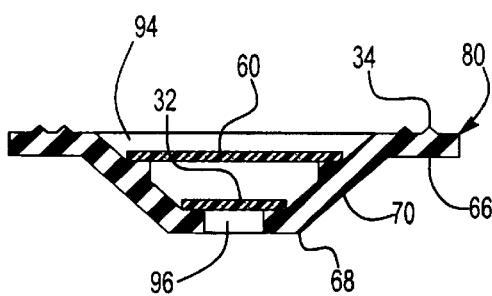
FIG. 5B is a cross sectional view of an alternative embodiment of the low vent pressure master brake cylinder reservoir cap diaphragm assembly.

In an alternative embodiment 80, as shown in FIG. 5B, a second piece of fluid flow restrictive material 60 is bonded to the first section 66 and covers the first section aperture 94.

While the present invention has been described as carried out in specific embodiments hereof, it is not intended to be limited thereby but is intended to cover the invention broadly within the scope and spirit of the appended claims.

What is claimed is:

1. A low vent pressure master brake cylinder reservoir cap diaphragm assembly comprising:
    a flexible sealing component having an aperture;
    a fluid flow restrictive material bonded to said flexible sealing component covering said aperture, wherein said fluid flow restrictive material restricts the amount of brake fluid that can pass through and allows air to freely pass through and said flexible sealing component has a raised section for providing a seal.

2. A low vent pressure master brake cylinder reservoir cap diaphragm assembly comprising:
    a flexible sealing component having an aperture;
    a fluid flow restrictive material bonded to said flexible sealing component covering said aperture, wherein said fluid flow restrictive material restricts the amount of brake fluid that can pass through and allows air to freely pass through and said flexible sealing component comprises a first section, a second section and a third section wherein said three sections are contiguous.

3. The diaphragm assembly of claim 2 wherein said first section is generally ring shaped having an aperture defining an inner circumferential surface and a longitudinal axis;
    said second section is generally cylindrical shaped having an internal bore extending along the longitudinal axis, said second section having a first end and a second end, said first end of said second section is connected to said first section adjacent said inner circumferential surface; and
    said third section is generally ring shaped having an aperture aligned with the longitudinal axis and an outer circumferential surface, said third section outer circumferential surface being connected to said second end of said second section.

4. The diaphragm assembly of claim 3 wherein said fluid flow restrictive material is bonded to said third section covering said third section aperture.

5. The diaphragm assembly of claim 4 further comprising a second piece of fluid flow restrictive material that is bonded to said first section and covers said first section aperture.

6. The diaphragm assembly of claim 2 wherein said first section is generally ring shaped having an aperture defining an inner circumferential surface and a longitudinal axis;
    said second section is generally conical shaped and hollow extending along the longitudinal axis, said second section having a first end having a first inner diameter and a second end having a second inner diameter, said first inner diameter is larger than said second inner diameter, said second section first end is connected to said first section adjacent said inner circumferential surface; and
    said third section is generally ring shaped having an aperture and an outer circumferential surface, said third section outer circumferential surface being connected to said second section second end.

7. The diaphragm assembly of claim 6 wherein said fluid flow restrictive material is bonded to said third section covering said third section aperture.

8. The diaphragm assembly of claim 7 further comprising a second piece of fluid flow restrictive material bonded to said first section covering said first section aperture.

9. A low vent pressure master brake cylinder reservoir cap diaphragm assembly comprising:
    a flexible sealing component having an aperture;
    a fluid flow restrictive material bonded to said flexible sealing component covering said aperture, wherein said fluid flow restrictive material restricts the amount of brake fluid that can pass through and allows air to freely pass through and said flexible sealing component is made from a rubber material.

10. A low vent pressure master brake cylinder reservoir cap assembly comprising:
    a master brake cylinder reservoir for holding brake fluid;
    a fill neck connected to said master cylinder reservoir;
    a flexible sealing component conforming to a shape of said fill neck, said flexible sealing component having an aperture;
    a fluid flow restrictive material bonded to said flexible sealing component and covering said aperture, said fluid flow restrictive material restricts the amount of brake fluid that can pass through and allows air to freely pass through; and
    a cap having a channel, said cap connects to said fill neck and said flexible sealing component is positioned between said cap and said fill neck.

11. The low vent pressure cap assembly of claim 10 wherein said flexible sealing component has a raised section creating a seal between said cap and said fill neck when said cap connects to said fill neck.

12. The low vent pressure cap assembly of claim 11 wherein said flexible sealing component is generally ring shaped and flat.

13. The low vent pressure cap assembly of claim 11 wherein said flexible sealing component comprises a first section, a second section and a third section wherein said three sections are contiguous.

14. The low vent pressure cap assembly of claim 13 wherein said first section is generally ring shaped having an aperture defining an inner circumferential surface and a longitudinal axis;

said third section is spaced apart from said first section along the longitudinal axis, said third section is generally ring shaped having an outer circumferential surface and an aperture aligned with the longitudinal axis; and said second section is hollow and positioned along the longitudinal axis, said second section has a first end and a second end wherein said first end is connected to said first section adjacent said inner circumferential surface and said second end is connected to said third section outer circumferential surface.

15. The low vent pressure cap assembly of claim 14 wherein said fluid flow restrictive material is bonded to said third section covering said third section aperture.

16. The low vent pressure cap assembly of claim 15 further comprising a second piece of fluid flow restrictive material that is bonded to said first section and covers said first section aperture.

* * * * *